United States Patent [19]

Hanssen

[11] 4,061,157
[45] Dec. 6, 1977

[54] RECIPROCATING VALVE HAVING STEM CLEANING MEANS

[75] Inventor: Albert J. Hanssen, North Kingstown, R.I.

[73] Assignee: International Telephone and Telegraph Corporation, Nutley, N.J.

[21] Appl. No.: 652,672

[22] Filed: Jan. 27, 1976

[51] Int. Cl.² .................................................. F16K 41/00
[52] U.S. Cl. .................................. 137/242; 15/256.5; 251/214; 277/24
[58] Field of Search ................ 251/214; 137/238, 242; 308/DIG. 7, DIG. 14, 3.5; 277/24, 105, DIG. 6; 15/256.5, 210 B

[56] References Cited

U.S. PATENT DOCUMENTS

| Re. 23,894 | 11/1954 | Burkhard et al. ................ 277/24 X |
| 2,368,137 | 1/1945 | Harmon ................................. 277/24 |
| 2,689,145 | 9/1954 | Magos et al. ...................... 277/105 |
| 2,757,896 | 8/1956 | Sangster .......................... 137/242 X |
| 2,983,562 | 5/1961 | Runton et al. ............ 308/DIG. 14 X |
| 3,084,945 | 4/1963 | Alexander ........................ 277/24 X |
| 3,352,316 | 11/1967 | Zahn .................................... 137/242 |
| 3,761,055 | 9/1973 | Ebuchi et al. ...................... 251/214 |

Primary Examiner—Martin P. Schwadron
Assistant Examiner—Richard Gerard
Attorney, Agent, or Firm—John T. O'Halloran; Peter C. Van Der Sluys

[57] ABSTRACT

A reciprocating valve is formed with a valve stem extending through a packing box which includes an outwardly facing conical surface disposed about the valve stem. The conical surface terminates in a knife-like edge which functions to remove accumulations of foreign material from exposed portions of the valve stem. As the stem moves into the packing box, a non-metallic liner is disposed between the packing box and the valve stem for positioning the knife-like edge in close proximity to and concentric with the valve stem.

13 Claims, 2 Drawing Figures

RECIPROCATING VALVE HAVING STEM CLEANING MEANS

BACKGROUND OF THE INVENTION

1. Field of the Invention

The present invention relates to reciprocating valves and more particularly to a means for removing accumulated material from an exposed portion of the stem of a reciprocating valve.

2. Description of the Prior Art

Heretofore, reciprocating valves with stems that are exposed to atmospheric conditions had a tendency to malfunction when foreign matter accumulated on the exposed valve stems and blocked movement of the valve stems into the valve bodies. The most common material that accumulated on the exposed valve stems was ice, which formed at sub-freezing temperatures during misty, rainy or snowy weather. When a valve stem was withdrawn for a long period of time, ice formed a bridge between the valve body and the valve stem. The ice, on occasions, became so massive that the valve could not be closed, resulting in a malfunction that could prove hazardous in certain applications. The problem was particularly acute with cryogenic valves where the cold from the controlled fluid traveled through the valve stem, increasing the likelihood of ice formation on the valve stem.

The most common solution to the ice problem has been to provide a means for heating the valve stem. A number of different types of heating means, such as heating coils, heat lamps and steam nozzles, have been used to prevent the formation of ice. The application of heat was not a satisfactory solution from an economic point of view, especially when one considers the present energy crisis. Additionally, the use of electric heating coils or lamps created a hazard when cryogenic material, such as liquefied natural gas, was controlled by the valve. In such cases, the heat lamps or coils required special explosion-proof housings to prevent the inadvertent ignition of gas that may leak from the valve.

Foreign matter, other than ice, also caused problems in that it was drawn into the packing material by the stem, thereby causing eventual failure of the packing and leakage about the stem.

SUMMARY OF THE INVENTION

The present invention contemplates the use of an outwardly facing conical surface terminating in a knife-like edge surrounding the reciprocating valve stem at a position where the stem extends out of the valve body. The knife edge is positioned close to the valve stem to allow only a minimal space, between the edge and the stem, in which liquids may enter and freeze. The spacing is maintained at a minimum through the use of a cylindrical liner or bearing, which is used to precisely position the edge close to and concentric with the valve stem.

In the event that a thin layer of ice forms on the valve stem when the stem is in the withdrawn position, the knife edge will merely shave off the ice when the actuator moves the stem to the closed position. In the event that a large mass of ice forms on the valve stem, the knife edge merely breaks the mass into pieces, thereby freeing the stem for reciprocating movement.

While the knife edge is particularly useful in removing ice, it also serves to remove large accumulations of other foreign matter. The liner also produces a wiping action along the stem for removal of smaller accumulations of foreign matter. Thus, the packing is protected and a longer packing life results.

The primary objective of the present invention is to provide a means for removing accumulations of foreign matter from the exposed stem of a reciprocating valve.

Another objective of the present invention is to provide a means for removing ice that may form on the exposed stem of a reciprocating valve.

Another objective of the present invention is to provide an inexpensive means that may be used with existing valves for preventing the freeze-up of a valve because of accumulations of ice on a withdrawn valve stem.

The above mentioned objectives and other advantages of the present invention will become apparent from the description of the invention which follows and from the drawings which are referred to therein.

DESCRIPTION OF THE INVENTION

Figure 1:
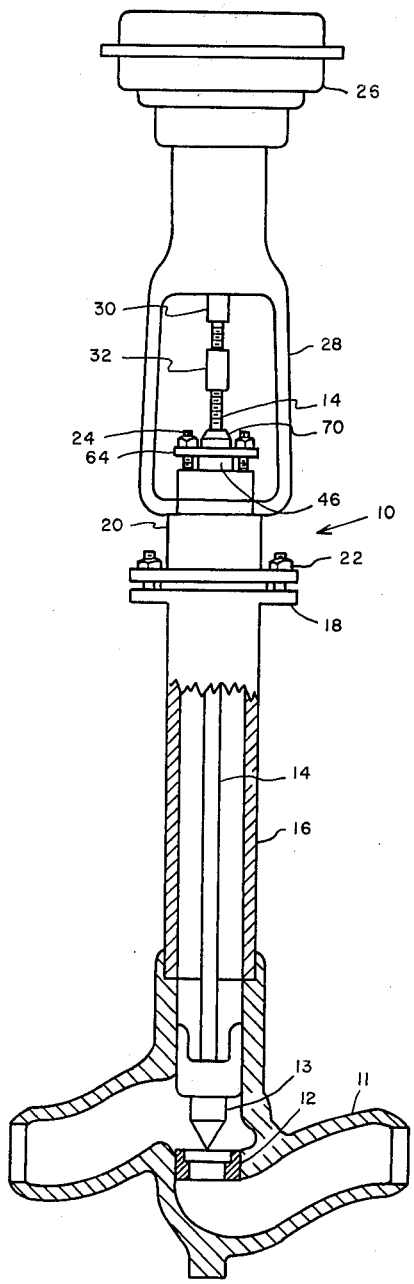
FIG. 1 is a cut-away view of a valve constructed in accordance with the present invention showing a portion of the valve in vertical section.

Referring to FIG. 1, there is shown a valve 10 constructed in accordance with the present invention. The valve 10 is essentially similar to ITT Hammel-Dahl Conoflow Valve Model V815 which is classified as a cryogenic valve. Valve 10 comprises a body 11 including a seat ring 12 and valve plug 13 and an upwardly extending valve stem 14 attached to the plug. The valve stem 14 extends through a concentrically disposed body neck extension 16, which extension terminates at an outwardly extending flange 18 at the uppermost end thereof. A valve bonnet 20 is mounted to the flange 18 using mounting studs 22. A packing box is formed inside the bonnet 20 and is defined by a bore 36 formed in the bonnet and the lower end of a packing follower 46 disposed in said bore and held in place by a packing flange 64 and studs 24. A valve actuator 26 is mounted to the bonnet 20 by a yoke portion 28 of the actuator 26. Actuator 26 includes a downwardly extending stem 30 which is coupled to the upwardly extending valve stem 14 by a coupling means 32. In operation, the actuator causes the valve stem to reciprocate in an upwardly and downwardly direction to open and close the valve respectively.

Figure 2:
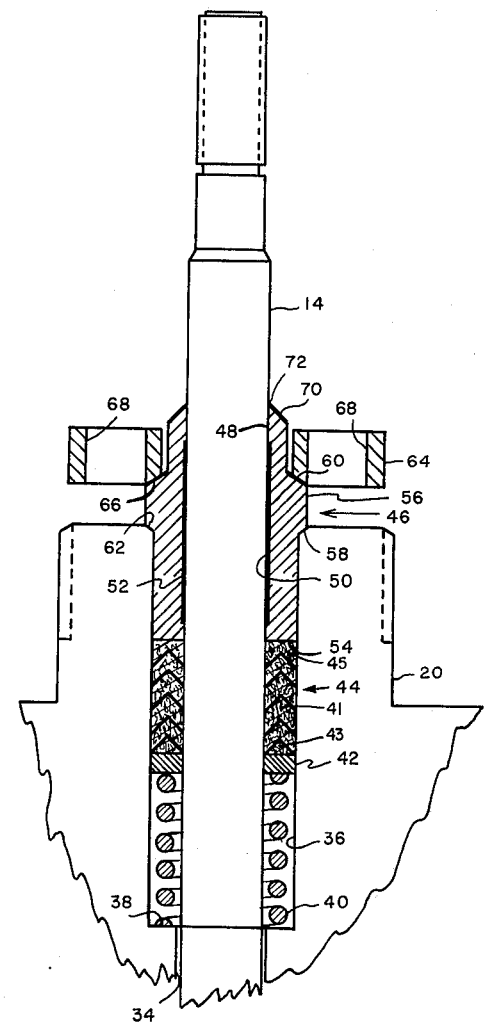
FIG. 2 is a partial vertical sectional view of the packing box portion of a valve constructed in accordance with the present invention.

Referring to FIG. 2, there is shown the details of one typical design of packing box including the packing follower. The valve bonnet 20 has a cylindrical bore 34 through which the valve stem 14 extends. An upper portion 36 of bore 34 is formed with an enlarged diameter so as to form a shoulder 38. A packing spring 40 is disposed in the upper portion 36 of the bore and rests on the shoulder 38. Disposed above and resting on the packing spring 40 is a packing washer 42 which forms a flat surface for engaging packing material 44 which may include a plurality of V rings 41 and a male 43 and female 45 chevron. The V rings may be formed of standard packing material such as Teflon or Teflon impregnated asbestos.

Mounted above the packing 44 and in engagement therewith is a packing follower 46 which has an internal bore 48 through which the stem 14 extends. Bore 48 is machined to a tolerance so as to provide a very close fit to the valve stem 14. A cylindrical recess 50 is formed inside the packing follower 46 for the purpose of receiving a close-fitting non-metallic liner or bearing 52 which is preferably formed of a self-lubricating material such as Teflon or a Teflon glass composition.

The packing follower 46 has a lower portion with a cylindrical outer surface that is disposed within the bore 36 of the bonnet 20. A lower end of the packing follower 46 is defined by a plane circular surface 54 which engages the packing material 44. The packing follower includes an outwardly extending flange 56 formed approximately midway between the ends of the follower. The flange is defined by a cylindrical surface and two conical surfaces 58 and 60. Conical surface 58 engages a similar conical surface 62 formed at the uppermost end of the cylindrical bore 36 of the bonnet 20. The packing follower is held in a stationary position against the bonnet by packing flange 64 which is disposed about the upper end of the packing follower and includes a conical surface 66 which engages the conical surface 60 of the packing follower. The packing flange includes a pair of openings 68 through which studs 24, shown in FIG. 1, extend for holding the packing flange in place against the packing follower so that no relative movement is permitted between the bonnet, the packing follower and the packing flange. The uppermost end of the packing follower has a conical surface 70 disposed at an acute angle, preferably approximately 45°, with the axis of the valve stem 14. The edge 72 formed by the cylindrical bore 48 and the conical surface 70 is essentially a knife edge that is closely fitted around the stem 14. Packing follower 46 is preferably formed of a hard non-corroding material such as stainless steel so that the knife edge is maintained.

Spring 40 compresses the packing material 44 against surface 54 of the packing follower, thereby effecting a seal between the valve stem 14 and the bore 36 formed in the bonnet, thereby preventing any leakage between the stem and the valve bonnet. The liner 52 provides a tight-fitting non-seizing bearing material between the stem and the packing follower so that the stem may easily reciprocate within the packing follower without being scratched. The use of such a liner allows for a very small clearance between bore 48 and the stem 14 and also maintains the stem concentric with the bore. The small clearance limits the volume of water that may enter and ice that may form between the packing follower and stem. When ice does form on exposed portions of the stem 14, the knife edge 72, which is closely fitted around the stem, tends to shave the ice from the stem if only a thin layer of ice is present. If a large mass of ice is formed on the stem, the knife breaks the mass into pieces that fall away.

The knife edge also functions to remove large accumulations of other foreign matter and the liner functions to wipe away any residue that is not removed by the knife.

In the event that a square or rectangular valve stem is used, it is contemplated that the various bores used in the invention would have a corresponding shape and that the knife edge would conform to the shape of the stem.

Thus, the present invention provides a means for removing ice or other foreign matter that may accumulate on the exposed valve stem of a reciprocating valve while the stem is in the withdrawn position. The use of a knife edge alone would be very ineffective if it could not be placed in close proximity to the surface of the valve stem 14 since significant portions of the foreign matter adhering to the valve stem would then pass through the packing follower where it could do damage to the packing material. If the knife is placed in contact with the stem, scoring results and the packing is quickly destroyed. Thus, it is apparent that the knife edge only becomes truly effective when the liner is used in conjunction therewith so that the knife edge may be placed in close proximity to and concentric with the valve stem so that significant amounts of foreign matter adhering to the valve stem may be scraped away by the knife and the residue wiped away by the liner prior to the stem's moving through the packing material. It is quite clear that the present invention provides an inexpensive but very effective means for removing material adhering to the valve stem so that the valve is free to open and close. The packing follower is formed so that it may easily be used with prior art reciprocating valves to provide them with the advantages of the present invention.

The present invention is particularly beneficial for use in cryogenic valves since it will alleviate any problems from valve stem freeze-up; however, it is to be understood that the present invention also is particularly useful for any reciprocating valve where the stem is exposed to external environmental conditions, such as sleet, sandstorms and other similar conditions that may have an adverse effect upon the valve packing and other internal structures of the valve should the foreign matter collected on the valve stem be introduced to the internal structure of the valve.

While the principles of this invention have been described above in connection with specific apparatus, it is to be understood that this description is made only by way of example and not as a limitation on the scope of the invention as set forth in the objects and features thereof and in the accompanying claims.

What is claimed is:

1. In a valve of the type that has a body with a valve seat disposed therein, a valve member disposed in said body for engagement with the valve seat and a reciprocating valve stem attached to said valve member and having a portion exposed by extending out of the valve body, the improvement comprising:
    first means fixedly mounted to the valve body and disposed about the valve stem at a position where said stem extends from said body for removing foreign matter from the exposed portion of the valve stem as the stem is reciprocated into the valve body; and
    bearing means disposed between said first means and said reciprocating valve stem for providing a tight fitting non-seizing bearing surface between said first means and the valve stem and for positioning said first means relative to the valve stem.

2. A valve as described in claim 1, wherein the means for removing foreign matter includes a surface disposed at an acute angle with the stem surface and having an edge positioned in close proximity to the surface of the valve stem.

3. A valve as described in claim 2, wherein the edge is circular and is formed by the intersection of a cylindrical bore surface and a conical surface.

4. A valve as described in claim 3, wherein the cylindrical surface and the conical surface are formed on a member attached to the valve body.

5. A valve as described in claim 4 wherein said bearing means is disposed between the member and the reciprocating valve stem for positioning the member relative to the valve stem so that the edge is in close proximity to and concentric with the surface of the valve stem, whereby the bearing means also functions to wipe away any residuary foreign matter from the stem.

6. A valve as described in claim 5, wherein the member is a packing follower which extends into the valve body for engaging packing material which is disposed about the valve stem for providing a seal between the valve body and the stem.

7. A valve as described in claim 6, wherein the packing follower is formed of stainless steel and the bearing means is formed of a self-lubricating fluorocarbon material.

8. A valve as described in claim 1, wherein the means for removing foreign matter comprises:
scraping means, disposed about the valve stem at a position where the stem enters the valve body, for removing large accumulations of foreign matter from the stem as the stem moves into the body; and
means, disposed inwardly of the scraping means, for wiping said stem as it moves into the body whereby any residuary foreign matter will be removed from the stem.

9. A valve comprising:
a valve body having a valve seat formed therein;
a valve member disposed in said body for engagement with said valve seat;
a valve stem attached to said valve member and extending from said body;
a valve actuator mounted to said valve body and connected to said valve stem for controllably reciprocating said stem and valve member;
first means fixedly attached to said valve body and disposed about said valve stem at a position where said stem extends from said valve body for removing foreign matter from the valve stem as the stem is moved by the actuator into the valve body; and
bearing means disposed between said first means and the reciprocating valve stem for providing a tight fitting non-seizing bearing surface between said first means and the valve stem and for positioning said first means relative to the valve stem.

10. A valve as described in claim 9, wherein said first means includes a surface disposed at an acute angle with the stem surface and having an edge disposed in close proximity to the valve stem for removing foreign matter from the stem as it is moved into the valve body.

11. A valve as described in claim 10, wherein the edge is formed by the intersection of a conical surface and a cylindrical surface that forms a bore through which the valve stem extends.

12. A valve as described in claim 11, wherein the conical and cylindrical surfaces are formed on a follower member which additionally includes a liner for providing said bearing surface between the member and the valve stem and for positioning the member about the valve stem so that a close clearance is provided between the edge and the surface of the valve stem and the edge is maintained concentric with the stem.

13. A valve as described in claim 9, wherein the means for removing foreign matter comprises:
scraping means, disposed about the valve stem at a position where the stem enters the valve body, for removing large accumulations of foreign matter from the stem as the stem moves into the body; and
means, disposed inwardly of the scraping means, for wiping said stem as it moves into the body whereby any residuary foreign matter will be removed from the stem.

* * * * *